(12) United States Patent
Gentner et al.

(10) Patent No.: US 9,908,505 B2
(45) Date of Patent: Mar. 6, 2018

(54) SEATBELT TENSIONER WITH A FORCE-LIMITING DEVICE, AND METHOD THEREOF

(75) Inventors: Bernd Gentner, Ellwangen/Pfahlheim (DE); Thomas Moedinger, Alfdorf (DE); Andreas Pregitzer, Ellenberg/Krassbronn (DE)

(73) Assignee: TRW Automotive GmbH (DE)

( * ) Notice: Subject to any disclaimer, the term of this patent is extended or adjusted under 35 U.S.C. 154(b) by 907 days.

(21) Appl. No.: 13/885,224

(22) PCT Filed: Aug. 11, 2011

(86) PCT No.: PCT/EP2011/004024
§ 371 (c)(1),
(2), (4) Date: Jun. 7, 2013

(87) PCT Pub. No.: WO2012/065654
PCT Pub. Date: May 24, 2012

(65) Prior Publication Data
US 2013/0327873 A1 Dec. 12, 2013

(30) Foreign Application Priority Data
Nov. 17, 2010 (DE) ........................ 10 2010 051 422

(51) Int. Cl.
*B60R 22/46* (2006.01)
*B60R 22/34* (2006.01)

(52) U.S. Cl.
CPC .......... *B60R 22/46* (2013.01); *B60R 22/4628* (2013.01); *B60R 22/341* (2013.01);
(Continued)

(58) Field of Classification Search
CPC . B60R 22/4633; B60R 22/4628; B60R 22/46; B60R 22/341; B60R 2022/468
(Continued)

(56) References Cited

U.S. PATENT DOCUMENTS 5,794,876 A 8/1998 Morizane et al.
5,906,327 A * 5/1999 Chamings ..................... 242/374
(Continued)

FOREIGN PATENT DOCUMENTS

| DE | 19524501 | 1/1996 |
|---|---|---|
| DE | 20303302 | 8/2003 |
| DE | 102006033234 | 1/2008 |

*Primary Examiner* — Michael R Mansen
(74) *Attorney, Agent, or Firm* — Tarolli, Sundheim, Covell & Tummino LLP

(57) ABSTRACT

A belt tensioner for a belt retractor having a load limiter includes a pivoted pinion (14) coupled to a belt reel, a drive unit and a load transmission element (20) moved by the drive unit. The load transmission element (20) engages in the pinion (14) so as to rotate the pinion in a tensioning direction A. The load transmission element (20) is designed so that in the rotational position adopted by the pinion (14) after being rotated by the load transmission element (20) a part (20b) of the load transmission element (20) engages in the pinion (14). A method of tensioning a seat belt by means of a belt tensioner and subsequent load limitation by means of a load limiter includes moving a load transmission element (20) by a drive unit in a first direction so that the load transmission element (20) engages in a pinion (14) coupled to a belt reel (12). The rotating the pinion (14) is rotated by the moved load transmission element (20) in a tensioning direction A. When the rotation of the pinion (14) is completed it is ensured that a part (20b) of the load transmission element (20) engages in the pinion (14).

2 Claims, 2 Drawing Sheets

(52) U.S. Cl.
CPC ..... *B60R 22/4633* (2013.01); *B60R 2022/468* (2013.01); *B60R 2022/4642* (2013.01)

(58) Field of Classification Search
USPC ........................................................ 242/374
See application file for complete search history.

(56) References Cited

U.S. PATENT DOCUMENTS

| | | | |
|---|---|---|---|
| 6,155,512 A * | 12/2000 | Specht et al. | 242/374 |
| 6,318,662 B1 * | 11/2001 | Hori et al. | 242/374 |
| 6,698,677 B1 * | 3/2004 | Happ et al. | 242/374 |
| 6,932,324 B2 * | 8/2005 | Biller et al. | 254/230 |
| 6,994,288 B2 * | 2/2006 | Wier | 242/374 |
| 7,080,799 B2 * | 7/2006 | Singer et al. | 242/374 |
| 7,422,173 B2 * | 9/2008 | Wier | 242/374 |
| 7,793,982 B2 * | 9/2010 | Krauss | 280/806 |
| 2004/0169105 A1 | 9/2004 | Wier | |
| 2006/0266866 A1 | 11/2006 | Schmidt et al. | |

* cited by examiner

SEATBELT TENSIONER WITH A FORCE-LIMITING DEVICE, AND METHOD THEREOF

RELATED APPLICATIONS

This application corresponds to PCT/EP2011/004024, filed Aug. 11, 2011, which claims the benefit of German Application No. 10 2010 051 422.5, filed Nov. 17, 2010, the subject matter of which are incorporated herein by reference in their entirety.

BACKGROUND OF THE INVENTION

The invention relates to a belt tensioner for a belt retractor comprising a load limiter. The invention further relates to a method of tensioning a seat belt and subsequent load limitation.

A belt tensioner is intended to tension the seat belt in a crash so that the vehicle occupant takes part as quickly as possible in the overall deceleration of the vehicle. By tensioning the seat belt especially the impacts of the film spool effect (belt webbing loosely rolled on the belt reel) and the belt slack (webbing that is not in close contact with the vehicle occupant) are reduced which have a negative influence on the restraint of the vehicle occupant.

A load limiter provides that the load of the seat belt acting on the vehicle occupant after tensioning does not excessively increase. In order to relieve the vehicle occupant, after locking the belt reel the belt reel is nevertheless allowed to rotate in the webbing unwinding direction (opposite to the tensioning direction), the rotation being decelerated, however, by energy conversion, i.e. by performing work (e.g. twisting a torsion rod).

In the case of most known belt retractors comprising a load limiter it is necessary to adjust a locking pawl prior to load limitation for locking the belt reel. However, the adjustment usually is not effectuated simultaneously with the end of the tensioning operation but with a time delay. This delay causes undesired decrease of the webbing load before the load limitation starts.

SUMMARY OF THE INVENTION

It is the object of the invention to optimize the transition between tensioning the seat belt and subsequent load limitation in a belt retractor comprising a belt tensioner and a load limiter.

This object is achieved by the disclosed belt tensioner.

The belt tensioner for a belt retractor comprising a load limiter according to the invention comprises a pivoted pinion coupled to a belt reel, a drive unit and a load transmission element moved by the drive unit. The load transmission element is designed so that a part of the load transmission element is engaged in the pinion in the rotational position adopted by the pinion after being rotated by the load transmission element.

The invention is based on the finding that the load drop occurring between completion of the tensioning operation and start of the load limitation can be avoided when in this period of time work is performed by or at a component arranged in the flow of load between the belt webbing and the belt reel. This work performance completely or at least partly compensates for the load drop. Also a deliberate over-compensation can be provided to purposefully initiate the load limitation at an increased load level.

This concept according to the invention is technically materialized by the fact that the part of the load transmission element still engaged in the pinion after tensioning is moved back from the pinion opposite to its driving direction. During moving back the work required to compensate for the load drop is performed, especially by heating and/or elastically or plastically deforming the load transmission element by friction.

According to the preferred embodiment of the invention, the load transmission element has at least one predetermined breaking point. The predetermined breaking point allows separating the load transmission element into plural parts so that after tensioning at least one separated part is retained in engagement with the pinion and is available for performing work.

Preferably the predetermined breaking point is designed so that the load transmission element breaks apart at the predetermined breaking point by a load exerted by the drive unit or the pinion on the load transmission element.

Alternatively, the predetermined breaking point can also be designed so that the load transmission element breaks apart already during assembly of the belt tensioner. Although the load transmission element then is separated already before the tensioning operation, the desired effect nevertheless can be achieved in that the fragments are arranged in series.

The predetermined breaking point is preferably formed by a recess, especially by a notch, or by a material weakening.

The load transmission element can also consist of at least two parts joined or assembled at a joint. In this case the joint constitutes the predetermined breaking point.

For a work sufficient for compensating the load drop being performed an advantageous configuration is such that the part of the load transmission element engaged in the pinion after the tensioning operation is designed so that it undergoes a friction fit and/or a form fit with a tensioning tube and/or a tensioning casing and/or the pinion and/or with another component of the belt tensioner. Then moving the part back can only be performed while overcoming the friction and/or form fit.

The invention also provides a method of tensioning a seat belt by means of a belt tensioner and subsequent load limitation by means of a force limitation by means of a load limiter. The method according to the invention comprises the steps of:

moving a load transmission element by a drive unit in a first direction so that the load transmission element is engaged in a pinion coupled to a belt reel;

rotating the pinion by the moved load transmission element in a tensioning direction A; and safeguarding that after completing rotation of the pinion a part of the load transmission element is engaged in the pinion.

Preferably the load transmission element breaks apart in the course of its movement. Alternatively also a forced breaking apart can be provided already when the belt tensioner is assembled.

In the preferred embodiment of the method according to the invention, the pinion is rotated after rotation in the tensioning direction A by a belt webbing load exerted by a vehicle occupant in a webbing unwinding direction B, wherein the pinion moves the part of the load transmission element being engaged in the pinion in a second direction opposite to the first direction.

In this case, a simple technical materialization of the inventive idea results from the fact that during moving the part of the load transmission element in the second direction work is performed at the part.

In order to ensure sufficient work performance the part should undergo a friction fit and/or a form fit with a tensioner tube and/or a tensioner casing and/or the pinion and/or with another component of the belt tensioner.

BRIEF DESCRIPTION OF THE DRAWINGS

Further features and advantages of the invention are resulting from the following description and from the attached drawings that are referred to. The drawings show in.

DESCRIPTION

Figure 1:
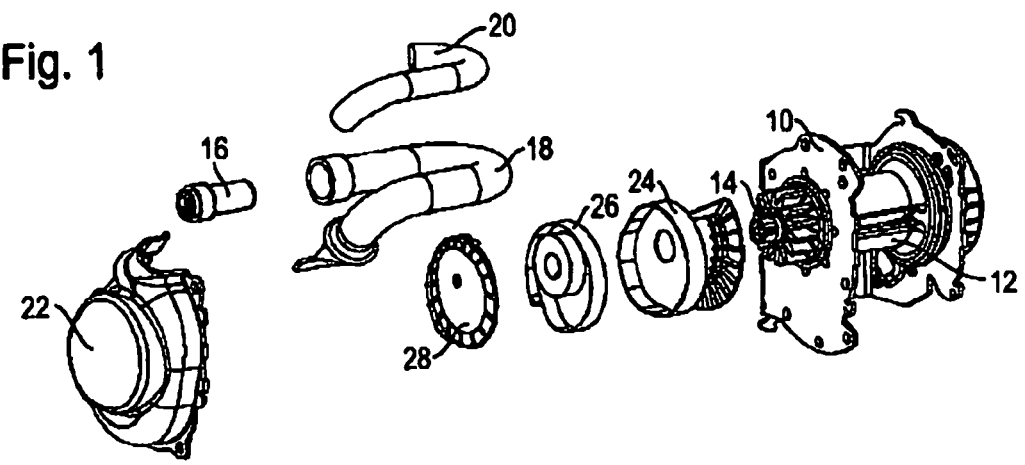
FIG. 1 an exploded view of a belt retractor comprising a belt tensioner according to the invention.
Figure 2:
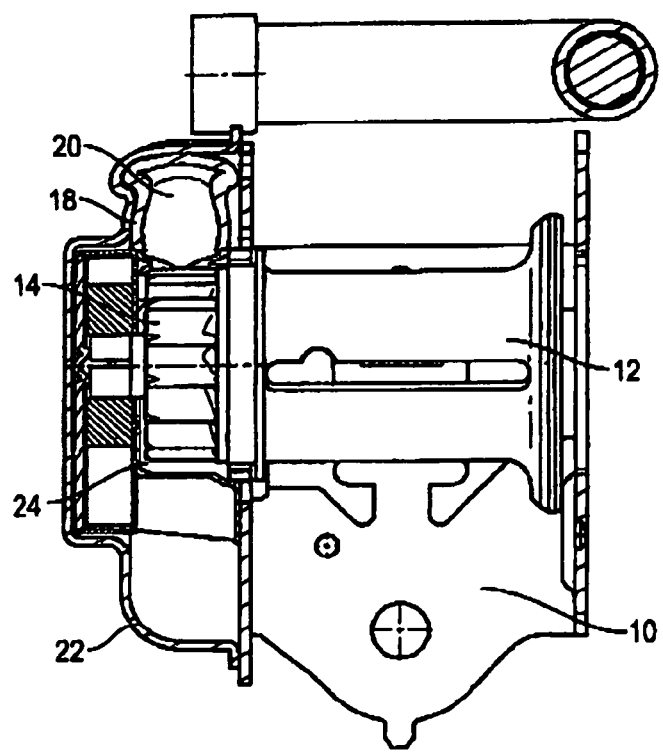
FIG. 2 a sectional view of the assembled belt retractor.

In FIG. 1 the substantial components of a belt retractor comprising a pyrotechnically driven belt tensioner are shown. In FIG. 2 the belt retractor is shown in the assembled state.

In a retractor frame 10 a belt reel 12 on which the belt strap can be wound or from which belt strap can be unwound is pivoted. A pinion 14 coupled to the belt reel 12 is pivoted on the frame 10.

The belt tensioner of the belt retractor includes a pyrotechnic drive unit comprising an igniter 16 as well as a load transmission element 20 movably arranged in a tensioner tube 18. The components of the belt tensioner are accommodated at least partially in a tensioner casing 22 mounted on the retractor frame 10.

Further a stop disk 24, a helical spring 26 disposed therein and a cover 28 are attached to the pinion 14. These components form the spring side of the belt retractor known per se as to its effect which is not important to the functioning of the belt tensioner, however.

Figure 3:
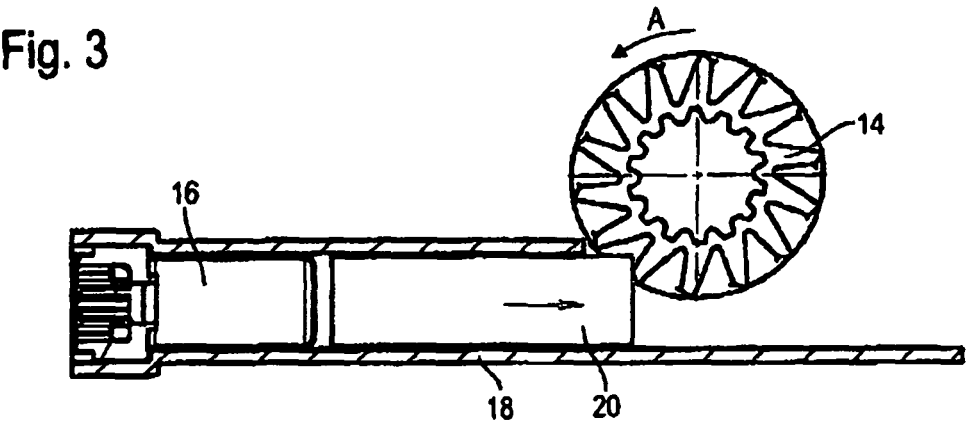
FIG. 3 a schematic partial section of the belt tensioner prior to tensioning.

FIG. 3 shows the belt tensioner in a simplified form before a tensioning operation. In the case of restraint the pyrotechnic drive unit is activated and generates a gas that pressurizes the load transmission element 20 (shown here without contour) in the tensioner tube 18. Thus the load transmission element 20 is moved in a first direction of movement away from the igniter 16, engages in the pinion 14 and rotates the pinion 14 in the tensioning direction A.

Figure 4A:
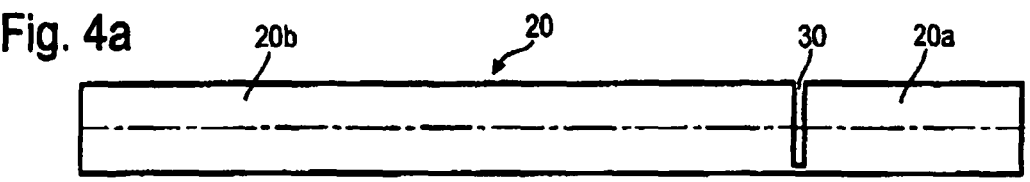
FIG. 4a the load transmission element of the belt tensioner according to a first embodiment.
Figure 4B:
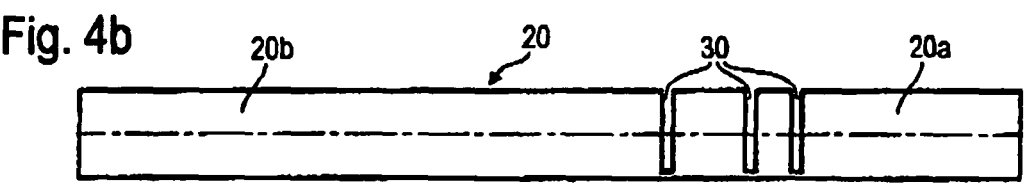
FIG. 4b the load transmission element of the belt tensioner according to a second embodiment.

FIGS. 4a and 4b illustrate two different embodiments of the load transmission element 20 (equally without contour), however having one or more predetermined breaking points 30 formed by notches. The predetermined breaking points 30 may also be formed by differently shaped recesses or material weakening. The load transmission element 20 may also be joined by or composed of plural parts so that the joints form the predetermined breaking points 30.

In the course of a tensioning operation the load transmission element 20 breaks apart at at least one predetermined breaking point 30. Rupture can be caused already by pressurizing the load transmission element 20 or only when the load transmission element 20, especially the predetermined breaking point(s), contact(s) the pinion 14. While at least one front part 20a of the load transmission element 20 is moved so far that it is disengaged from the pinion 14, at least one rear part 20b of the load transmission element 20 remains engaged in the pinion 14 even after the tensioning operation is completed.

As soon as the tensioning operation is completed, the load exerted by the vehicle occupant due to the vehicle deceleration on the belt webbing in the webbing unwinding direction B is predominant, i.e. a load change occurs. In order to allow the pinion 14 coupled to the belt reel 12 to move in the webbing unwinding direction B, it has to move the at least one rear part 20b of the load transmission element 20 still engaged in the pinion 14 back in a second direction of movement opposite to the first direction of movement, i.e. in the direction of the igniter 16.

For this movement of the load transmission element 20 back into the tensioner tube 18 and into the tensioner casing 22 work has to be performed, because the load transmission element 20 is in friction fit and/or form fit with the tensioner tube 18 and/or the tensioner casing 22 and/or the pinion 14 and/or with another component, in particular one of the guides at the spring side of the belt tensioner. The work performed completely or at least partly compensates for the load drop prior to load limitation. The work performance can also be used as a defined increase in load during load limitation.

Figure 5:
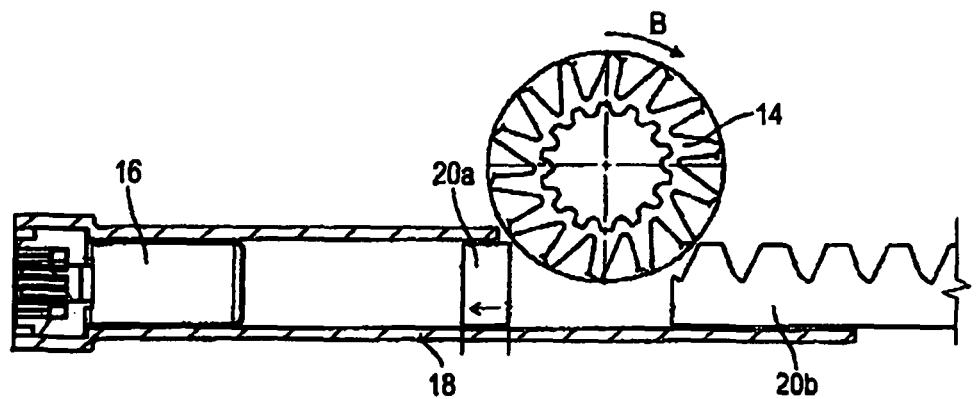
FIG. 5 a schematic partial section of the belt tensioner after tensioning.

FIG. 5 shows the belt tensioner in a state after moving the load transmission element 20 back in which the rear part 20b of the load transmission element 20 is completely disengaged from the pinion 14 again.

An alternative embodiment provides that the load transmission element 20 breaks apart and is separated, respectively, already during assembly thereof. It is essential to the function of compensating for the load drop that after tensioning at least one separated part of the load transmission element 20 remains engaged in the pinion.

The course of the webbing load can be adjusted before and at the start of load limitation by the respective arrangement and design of the predetermined breaking point(s) 30 at the load transmission element 20.

The invention claimed is:

1. A belt tensioner for a belt retractor including a load limiter, comprising:
a pivoted pinion (14) coupled to a belt reel (12),
a drive unit and
a load transmission element (20) moved by the drive unit that engages in the pinion (14) so as to rotate the pinion (14) in a tensioning direction A,
wherein the load transmission element (20) is designed to ensure that a part (20b) of the load transmission element (20) is engaged in the pinion (14) in a rotational position adopted by the pinion (14) after rotation by the load transmission element (20)
and wherein the load transmission element is elastically or plastically deformed during a backward movement,
wherein the load transmission element is moved by the drive unit in a first direction and the pinion is rotatable in an unwinding direction to move the part of the load transmission element engaged in the pinion in a second direction opposite the first direction, the part of the load transmission element engaged in the pinion being elastically or plastically deformed ahead of the pinion along the second direction during movement of the part of the load transmission element in the second direction.

2. A belt tensioner for a belt retractor including a load limiter, comprising:
- a load transmission element having a front part and a rear part;
- a drive unit for moving the load transmission element;
- a belt reel; and
- a pinion coupled for rotation with the belt reel, the pinion being rotated in a tensioning direction by movement of the load transmission element in a first direction, the load transmission element being designed so that the rear part remains engaged with the pinion after the pinion completes rotation in the tensioning direction, the pinion being rotatable in an unwinding direction to move the rear part in a second direction opposite the first direction to elastically or plastically deform the rear part located ahead of the pinion along the second direction.

* * * * *